United States Patent [19]
Frey

[11] Patent Number: 5,906,345
[45] Date of Patent: May 25, 1999

[54] VEHICLE SEAT RACK

[76] Inventor: James C. Frey, 411 Dutch Mill Court, Flushing, Mich. 48433

[21] Appl. No.: 09/082,806
[22] Filed: May 21, 1998

Related U.S. Application Data

[63] Continuation of application No. 08/642,768, May 6, 1996, abandoned.
[51] Int. Cl.$^6$ ................................................ F16M 11/00
[52] U.S. Cl. .......................................................... 248/200
[58] Field of Search ............................... 248/200, 220.21, 248/220.31, 224.8, 309.1, 301, 323, 304, 327, 503.1, 503, 201; 211/87.01, 103, 175, 208, 105.1, 98, 70.6; 446/123, 102, 95; 296/63, 65.1, 65.01, 65.03

[56] References Cited

U.S. PATENT DOCUMENTS 3,199,464  8/1965  Shook ........................................ 211/175
5,497,708  3/1996  Jeruzal ................................ 248/503.1 X

*Primary Examiner*—Ramon O. Ramirez
*Assistant Examiner*—Stephen S. Wentsler
*Attorney, Agent, or Firm*—Weintraub & Brady, P.C.

[57]  ABSTRACT

The present invention provides a rack for securely mounting a removable vehicular seat thereto. The rack includes at least one support comprising a support portion and a mounting portion. The support portion includes a plurality of apertures separated by a distance substantially equal to the distance separating mounting latches on the vehicle seat such that each of the latches may engage one of the apertures.

4 Claims, 4 Drawing Sheets

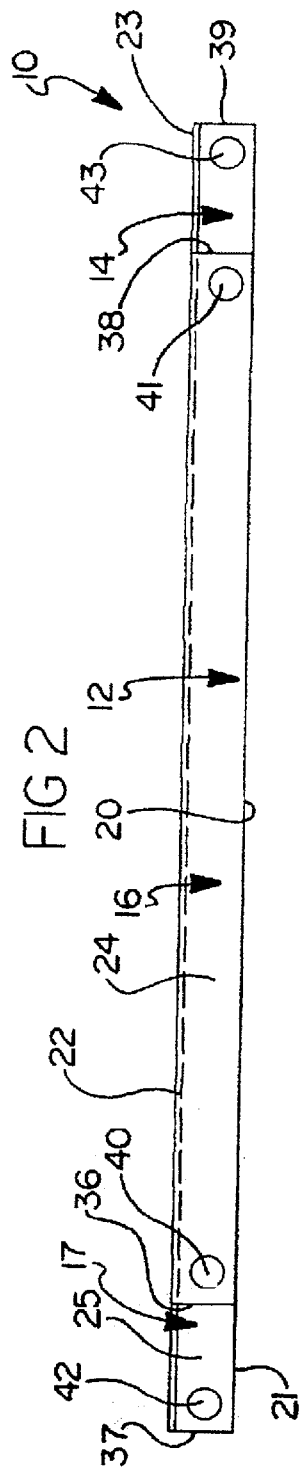
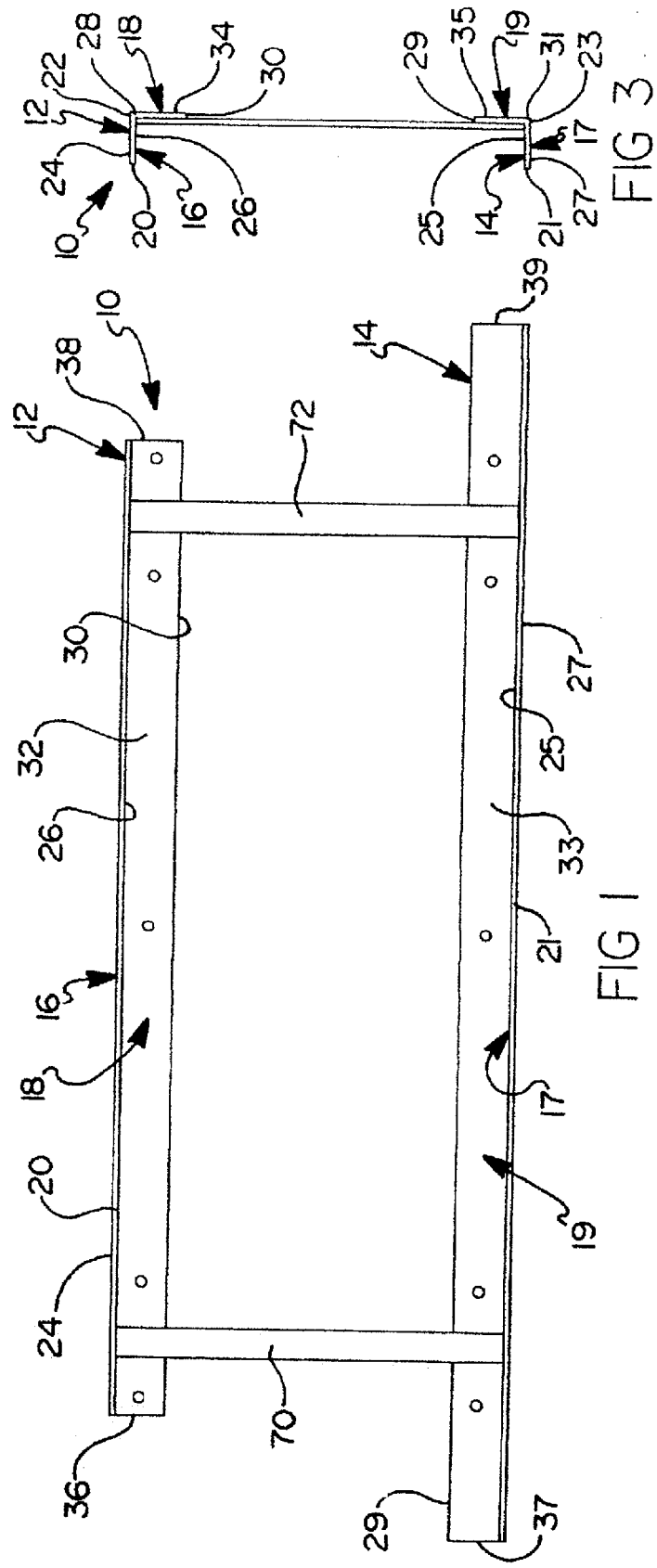

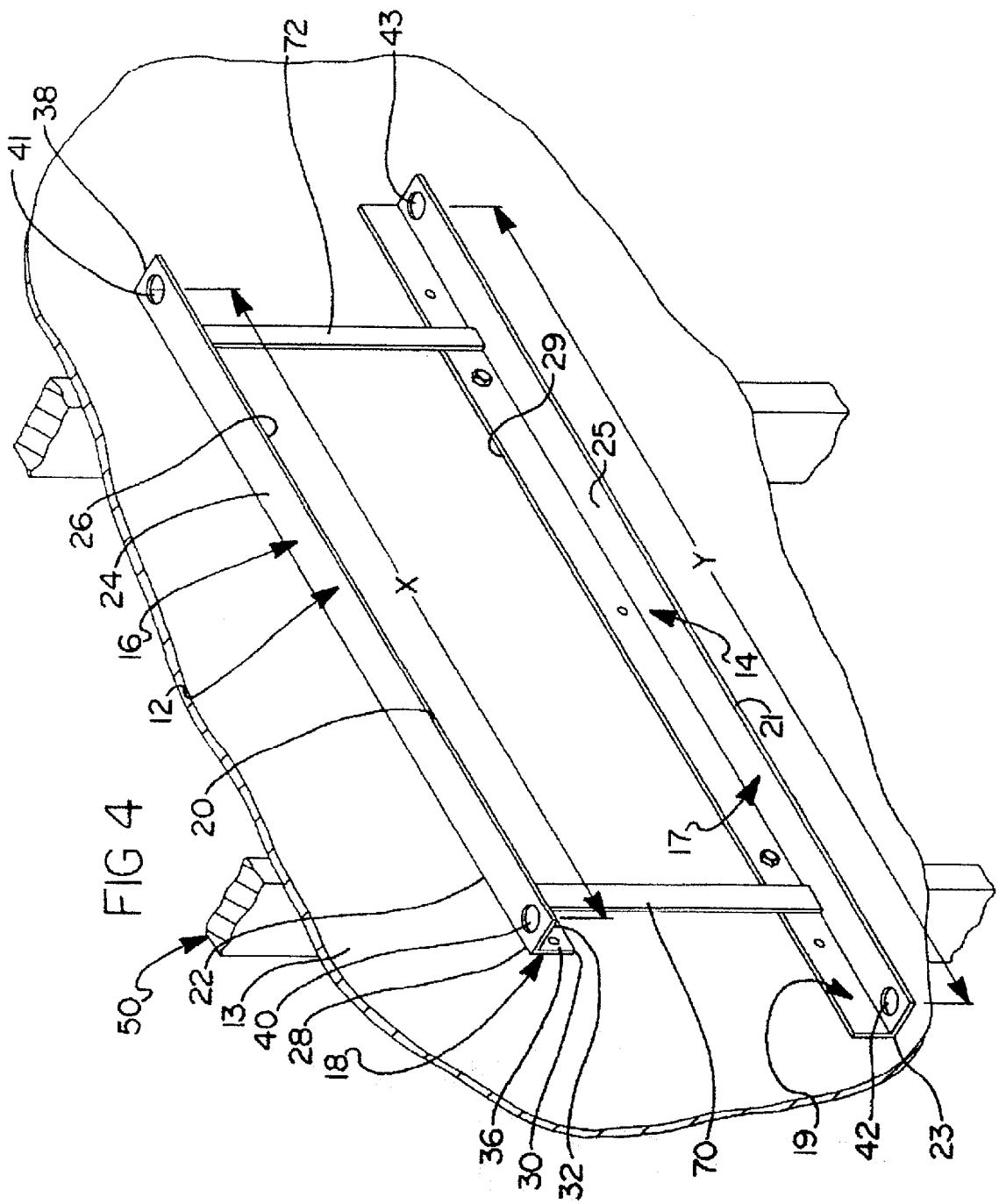

5,906,345

VEHICLE SEAT RACK

CROSS-REFERENCE TO RELATED APPLICATIONS

This application is a continuation application of U.S. patent application Ser. No. 08/642,768, entitled "VEHICLE SEAT RACK," filed May 6, 1996, now abandoned, the disclosure of which is incorporated herein by reference.

BACKGROUND OF THE INVENTION

1. Field of the Invention

The present invention relates to automotive accessories. More particularly, the present invention relates to mounting racks for automotive accessories. Even more particularly the present invention discloses a mounting rack for retaining a removable vehicular seat.

2. Description of the Prior Art

Currently, there are produced many vehicles that include removable and configurable seats. These seats are generally found in minivans and sport utility vehicles. Seating arrangements in such vehicles may be configured depending upon how the vehicle is to be utilized.

For example, if one has to transport many people, then all the seats may be included in the vehicle. However, if one has to move furniture or other bulky items, then all or some of the seats may be removed to provide the cargo space necessary to transport such items.

Removable vehicular seats include at least two and generally four hooks or brackets that interlock with floor mounted rods when the seat is mounted interiorly the vehicle. If one removes a seat from a vehicle it is unadvisable to place the seat upon the ground because the hooks may become damaged if the seat is sat upon while on the ground.

Currently, if one removes a seat from such a vehicle, the seat should be preferably stored in some dry, clean environment. Generally, though, such an environment is not readily available. As such, many seats are left on the floor of garages or outside while the vehicle is used. This, of course, presents several problems. First, the seat may be damaged by inclement weather. Second, the seat may become dirtied. Additionally, such seats are heavy and can injure small children.

Therefore, what is needed in the art is a device that allows easy and safe storage of removable vehicular seats when they are removed from the vehicle in which they are used. Additionally, what is needed is a device that provides seat storage such that a child cannot hurt themselves while playing around the seat after it has been removed from the vehicle. It is to the solution of the above mentioned problems to which the present invention is directed.

SUMMARY OF THE INVENTION

The present invention provides a vehicle seat rack comprising:

(a) at least one support comprising means for engaging a vehicular seat; and (b) means for mounting the rack to a surface.

The present invention includes at least one substantially horizontal aligned support that securely retains a vehicular seat when it is mounted thereupon. The rack may additionally include additional supports depending upon the style of the seat which is to be mounted to the rack.

Additionally, if multiple supports are employed, the present invention may include stabilizers mounted to and extending between such supports to provide additional stability depending upon the weight of the seat to be mounted thereto.

The present invention additionally includes means for mounting the rack to a surface, such as a vertically oriented wall.

The present invention will be more readily understood with reference to the detailed description and to the description of the drawings in which like reference numerals refer to like parts and in which:

BRIEF DESCRIPTION OF THE DRAWINGS

FIG. 1 is a front plan view of a vehicle seat rack in accordance with the present invention;

FIG. 2 is a top plan view of a seat rack assembly in accordance with the present invention;

FIG. 3 is a side plan view of a seat rack assembly in accordance with the present invention;

FIG. 4 is an isometric, environmental view of a seat rack in accordance with the present invention shown mounted to a wall.

PREFERRED EMBODIMENT OF THE PRESENT INVENTION

Figure 5:
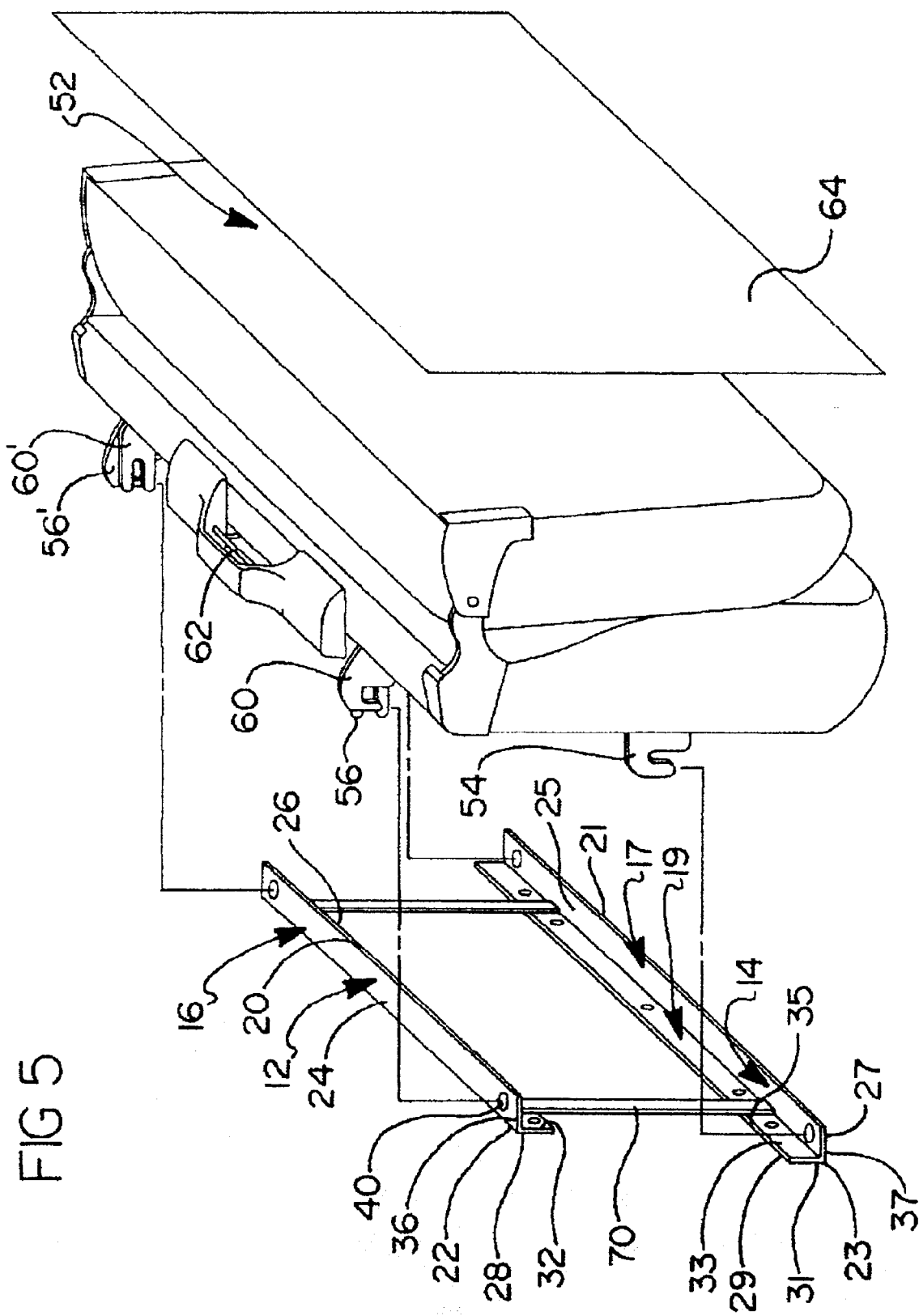
FIG. 5 is an oblique environmental view of a seat rack in accordance with the present invention with a seat in position to be mounted thereto.

Referring now to FIGS. 1–3, there is depicted therein a preferred embodiment of an automotive seat rack in accordance with the present invention, and generally shown at 10. The seat rack 10 comprises at least one support comprising means for engaging a vehicular seat and means for mounting the rack to a surface, such as a vertically oriented wall.

The preferred embodiment of the present invention is configured to securely retain a vehicular removable seat such as those found in the GMC Suburban; however, other removable seats with similar configurations may seat upon the rack 10 as well.

The rack 10 preferably includes a first support 12 and a second support 14. The number of supports that are necessary is dependant on the configuration of the vehicular seat which is to be supported. Because the preferred embodiment of the seat rack 10 is utilized to support a heavy seat, each support 12, 14 is preferably formed from some highly strong durable material such as steel, graphite, nylon or the like.

The first support 12 and the second support 14 each preferably include a horizontally aligned support portion 16, 17 and a substantially vertically aligned mounting portion 18, 19. A vehicular removable seat will be supported by the support portions 16, 17, while the mounting portions 18, 19 of the first support 12 and the second support 14 provide means for mounting the rack 10 to a wall 13 or other surface which will be discussed in further detail hereinbelow.

The support portion 16 and the mounting portion 18 of the first support 12 extend horizontally and are preferably about the same length to make mounting the rack 10 to a surface as easy a task as possible. Likewise, the support portion 17 and the mounting portion 19 of the second support 14 extend horizontally and are also preferably equal in length.

The support portions 16, 17 each have a front edge 20 and 21, a rear edge 22 and 23, a top surface 24, 25, and a bottom surface 26, 27. The mounting portions 18, 19 each have, respectively, a top edge 28, 29, a bottom edge 30, 31, a front surface 32, 33 and a rear surface 34, 35.

As shown, the support portions 16, 17 and the mounting portions 18, 19 are preferably formed integrally with each other, or they may be formed separately and then mounted to one another via welding, bonding or some other well known means for mounting.

The rear edge 22 of the support portion 16 of the first support 12 is preferably mounted to the top edge 28 of the mounting portion 18 of the first support 12. Additionally, the rear edge 23 of the support portion 17 is preferably mounted to the bottom edge 31 of the mounting portion 19 of the second support 14. In this fashion, the support portions 16, 17 forwardly extend from the mounting portions 18, 19 ensuring that the mounting portions 18, 19 will not interfere with placing a vehicle seat upon the support portions 16, 17 as will be described in detail hereinbelow.

As can be seen in FIGS. 1 and 2, the first support 12 has a first end 36 and a second end 38 and extends therebetween. The second support 14 also has a first end 37 and a second end 39 and extends therebetween.

The respective support portions 16, 17 of the first support 12 and the second support 14 serve as means for engaging a vehicular seat. As depicted in FIGS. 4 and 5, each support portion 16, 17 includes at least one aperture formed between the respective top surface 24, 25 and bottom surface 26, 27. Preferably, support portion 16 includes two apertures 40, 41 separated by a distance x and support portion 17 includes two apertures 42, 43 separated by a distance y. As an example, and to suit the mounting of a GMC Suburban seat, the distance x is between 29 and 32 inches and the distance y is between 39 and 41 inches. In essence, the distance separating the apertures should be substantially equal to the distance between hooks that are disposed on the vehicle seat. This, along with the process of mounting a seat to the rack 10 will be discussed hereinbelow.

Figure 6:
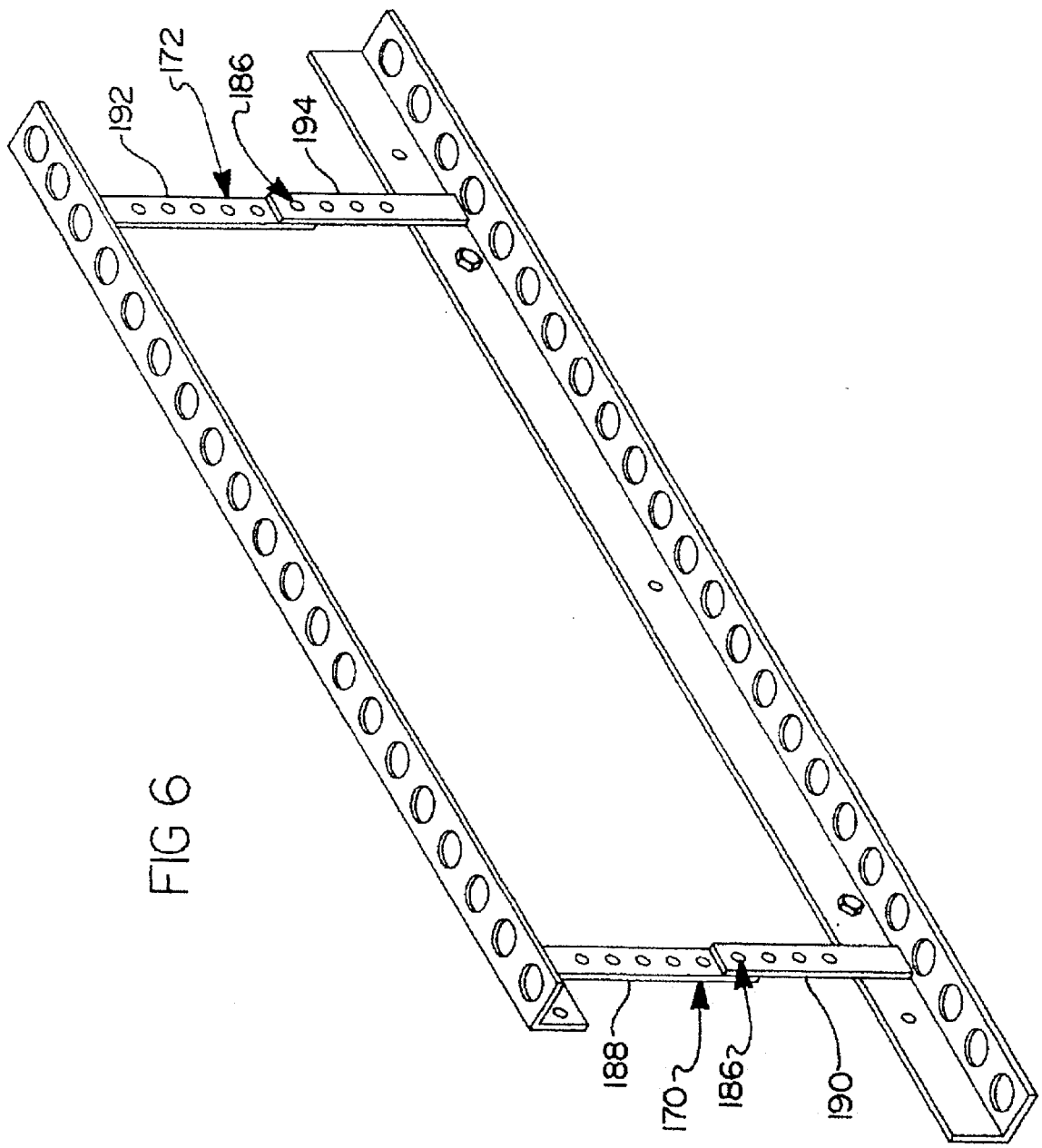
FIG. 6 is an alternative embodiment of a vehicle seat rack with adjustable connectors.

Alternatively, and as depicted in FIG. 6, a series of adjacent apertures 80 may be included in each of the support portions 16, 17. By providing such a series of adjacent apertures 80, many seats of various configurations may be removably mounted upon the assembly 10.

In use, the rack 10 is mounted to a wall 13 or other surface. The mounting portions 18, 19 of the first support 12 and the second support 14 each have the plurality of apertures formed between their respective front surfaces 32, 33 and their respective rear surfaces 34, 35. As such, the rack 10 may be mounted to a wall via nails, lag screws, rivets, or the like that pass through the apertures into the wall 13 or other surface.

To ensure the stability of the rack 10, the distance between each of the plurality of respective apertures may be twelve inches, sixteen inches, or a combination thereof. This provides a user the ability to mount the rack 10 to studs located anterior the wall 13, as shown in FIG. 4. Studs 50, such as those shown, are generally separated by a distance of either twenty-four or sixteen inches. As such, by supplying a plurality of apertures in each support portion 16, 17 separated by distances of sixteen and twelve where twenty-four inches is a multiple of the spacing of the apertures, the screws, nails, or the like may be mounted to the studs 50.

Additionally, and to provide extra stability, the first support 12 and the second support 14 are connected via at least one, and preferably two connectors 70, 72. The connectors are formed from the same materials as the supports 12, 14, and extend therebetween and are mounted to the supports via welding, glue, or the like. The connectors 70, 72 ensure that the rack 10 remains in proper alignment so that a seat may be placed upon the rack.

As depicted in FIG. 6, each of the connectors 170 and 172 may be adjustable. Essentially, each of the connectors may include means 186 for adjusting the length of each of the connectors 170, 172. This may be accomplished via a plurality of apertures formed through two separate connector portions 188, 190, 192, 194. A screw, bolt or the like may be used to connect each of the respective connector portions.

A vehicular seat 52, such as that depicted in FIG. 5 has a plurality of front latches 54 and a plurality of rear latches 56. The latches 54, 56 all face forwardly; however, they may face rearwardly depending upon the make of the seat.

When mounting the seat 52 to the rack 10, one of the plurality of rear seat latches 56, which are generally used to mount the seat within a vehicle, seats in each aperture 40, 41. Additionally, one of the plurality of front seat latches 54 seats in each aperture 42, 43. It must be appreciated that the distances x and y should be approximately equal to the respective distance between each of the rear seat latches 56 and front seat latches 54 on the vehicle seat 52 to be mounted to the rack 10. Thus, the latches 54, 56 may each seat in a corresponding aperture 40, 41, 42, 43.

Additionally, it must be appreciated that the preferred embodiment is designed to have the rear seat latches 56 mount in the apertures 40, 41. However, if the configuration of the latches 54, 56 is reversed, i.e. if they face rearwardly as opposed to forwardly, then the front seat latches 54 would mount in the apertures 40, 41.

Each of the plurality of front seat latches 54 seat in a corresponding aperture 42, 43 in the support portion 17 of the second support 14. Additionally, and as depicted in FIG. 5, the rear seat latches 56 include a locking mechanism 60. As such, when the latches 56 engage and seat within the aperture 40, 41, the locking mechanism 60 ensures that the seat 52 cannot be removed without releasing the locking mechanism 60. Generally, such mechanisms are released via a handle 62 which is disposed on the seat 52. Because the seat cannot be removed from the rack 10 without releasing the locking mechanism 60, small children will not be able to remove the seat 52 from the rack 10.

The present invention, to wit, the rack 10 provides safe storage of a removable seat. Additionally, the present invention, as contemplated, includes a cover 64 which may be unfolded and placed over the seat 52 once it has been mounted to the rack 10. The cover 64 ensures that dust does not settle on the seat 52, especially if the rack 10 is mounted in a garage or other possibly grimy area.

Although the invention has been described with reference to a particular embodiment, it is to be understood that this embodiment is merely illustrative of the application of the principles of the present invention. Numerous modifications may be made therein and other arrangements may be devised without departing from the spirit and scope of the invention.

Having thus said, what is claimed is:

1. A combination comprising:
   (a) a vehicular removable seat, the seat having a pair of spaced apart front vehicle seat latches and a pair of spaced apart rear vehicle seat latches,
   (b) a vertically-oriented surface
   (c) a rack mounted to said vertically-oriented surface, said rack including a first support and a second support, the first support and the second support being vertically spaced apart from each other, the second support having a length which is greater than a length of the first support, each support comprising a horizontal support portion and a mounting portion, each of the horizontal support portions having at least two spaced apart apertures formed therein, the at least two spaced apart apertures of the horizontal support portion of the first support being separated by a predetermined distance substantially equal to the distance between the spaced apart rear vehicle seat latches and the at least two spaced apart apertures of the horizontal support portion of the second support being separated by a predetermined distance substantially equal to the distance between the spaced apart front vehicle seat latches, the at least two spaced apart apertures of the horizontal support portion of the first support receives and supports the pair of spaced apart rear vehicle seat latches and the at least two spaced apart apertures of the horizontal support portion of the second support receives and supports the pair of spaced apart front vehicle seat latches, the mounting portion of each of the supports having at least two spaced apart apertures formed therein, each of the at least two spaced apart apertures of the mounting portions assisting in the mounting of the rack to said vertically-oriented surface; and (d) at least one connector for connecting the first support and the second support.

2. The combination of claim 1 wherein the at least two spaced apart apertures in each of the mounting portions are separated by a distance of twelve inches.

3. The combination of claim 1 wherein the at least two spaced apart apertures in the horizontal support portion of the first support are separated by a distance of about thirty inches.

4. The combination of claim 1 wherein the at least two spaced apart apertures in the horizontal support portion of the second support are separated by a distance of about 39 inches.

\* \* \* \* \*